(12) United States Patent
Ju et al.

(10) Patent No.: US 10,834,561 B2
(45) Date of Patent: Nov. 10, 2020

(54) SMART HARDWARE OPERATION METHOD AND APPARATUS

(71) Applicant: TENCENT TECHNOLOGY (SHENZHEN) COMPANY LIMITED, Shenzhen (CN)

(72) Inventors: Zhihui Ju, Shenzhen (CN); Jianing Lv, Shenzhen (CN); Sijin Guo, Shenzhen (CN); Qiuli Huang, Shenzhen (CN); Tao Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 379 days.

(21) Appl. No.: 15/832,457

(22) Filed: Dec. 5, 2017

(65) Prior Publication Data

US 2018/0098185 A1 Apr. 5, 2018

Related U.S. Application Data

(63) Continuation of application No. PCT/CN2016/099089, filed on Sep. 14, 2016.

(30) Foreign Application Priority Data

Sep. 23, 2015 (CN) .......................... 2015 1 0611073

(51) Int. Cl.
*H04W 4/80* (2018.01)
*A63F 13/235* (2014.01)
(Continued)

(52) U.S. Cl.
CPC ............... *H04W 4/80* (2018.02); *A63F 13/21* (2014.09); *A63F 13/235* (2014.09);
(Continued)

(58) Field of Classification Search
CPC ...... A63F 13/21; A63F 13/235; A63F 13/245; A63F 13/42; A63F 13/80; G06F 3/017;
(Continued)

(56) References Cited

U.S. PATENT DOCUMENTS 8,332,544 B1 * 12/2012 Ralls ....................... A63F 13/92
340/573.1
10,258,888 B2 * 4/2019 Pedersen ................ A63H 27/12
(Continued)

FOREIGN PATENT DOCUMENTS

| CN | 104010706 A | 8/2014 |
| CN | 105148513 A | 12/2015 |

(Continued)

OTHER PUBLICATIONS

The World Intellectual Property Organization (WIPO) International Search Report for PCT/CN2016/099089 dated Dec. 23, 2016 6 Pages (including translation).
(Continued)

*Primary Examiner* — Jerry B Dennison
(74) *Attorney, Agent, or Firm* — Anova Law Group, PLLC

(57) ABSTRACT

Embodiments of the present disclosure disclose a smart hardware operation method and apparatus. The method includes running a game application on a first client; exchanging data with a first smart hardware device that is in wireless communication with the first client, the game application displaying information about the first smart hardware device; and displaying updated data about the first smart hardware device in the game application.

17 Claims, 9 Drawing Sheets

(51) Int. Cl.
  *A63F 13/42* (2014.01)
  *A63F 13/21* (2014.01)
  *A63F 13/245* (2014.01)
  *A63F 13/80* (2014.01)
  *G06F 3/0346* (2013.01)
  *H04W 4/21* (2018.01)
  *G06F 3/0481* (2013.01)
  *G06F 3/01* (2006.01)
  *H04W 4/70* (2018.01)
  *H04L 29/06* (2006.01)
  *G06F 3/048* (2013.01)

(52) U.S. Cl.
  CPC ............ *A63F 13/245* (2014.09); *A63F 13/42* (2014.09); *A63F 13/80* (2014.09); *G06F 3/017* (2013.01); *G06F 3/0346* (2013.01); *G06F 3/0481* (2013.01); *H04L 67/38* (2013.01); *H04W 4/21* (2018.02); *H04W 4/70* (2018.02); *G06F 3/048* (2013.01); *H04L 63/102* (2013.01)

(58) Field of Classification Search
  CPC ...... G06F 3/0346; G06F 3/048; G06F 3/0481; H04L 63/102; H04L 67/38; H04W 4/21; H04W 4/70; H04W 4/80
  See application file for complete search history.

(56) References Cited

U.S. PATENT DOCUMENTS

| | | | |
|---|---|---|---|
| 2005/0202905 A1* | 9/2005 | Chesser | A63B 24/0021 473/415 |
| 2006/0148594 A1* | 7/2006 | Saintoyant | A63B 69/3632 473/405 |
| 2007/0243914 A1* | 10/2007 | Yan | A63H 30/04 463/2 |
| 2008/0261693 A1 | 10/2008 | Zalewski | |
| 2009/0284553 A1* | 11/2009 | Seydoux | A63F 13/12 345/649 |
| 2010/0009735 A1* | 1/2010 | Seydoux | A63F 13/803 463/6 |
| 2010/0035688 A1* | 2/2010 | Picunko | A63F 13/10 463/39 |
| 2013/0005466 A1* | 1/2013 | Mahajan | A63F 13/798 463/36 |
| 2013/0190090 A1* | 7/2013 | Lin | A63H 17/045 463/36 |
| 2014/0180451 A1* | 6/2014 | Marty | G06K 9/00342 700/91 |
| 2014/0364209 A1 | 12/2014 | Perry | |
| 2015/0290545 A1* | 10/2015 | Barney | A63F 13/00 463/32 |
| 2015/0301031 A1* | 10/2015 | Zin | H04W 4/80 436/164 |
| 2017/0010607 A1* | 1/2017 | Barlas | H04N 5/2252 |
| 2018/0078851 A1* | 3/2018 | Guo | A63F 13/42 |
| 2018/0098185 A1* | 4/2018 | Ju | A63F 13/21 |
| 2018/0214758 A1* | 8/2018 | Mosher | A63B 69/3658 |
| 2019/0005733 A1* | 1/2019 | Wehner | G06T 7/70 |
| 2020/0001188 A1* | 1/2020 | Pedersen | A63F 13/92 |

FOREIGN PATENT DOCUMENTS

| | | |
|---|---|---|
| EP | 2497542 A3 | 10/2012 |
| JP | 2010020742 A | 1/2010 |

OTHER PUBLICATIONS

The State Intellectual Property Office of the People's Republic of China (SIPO) Office Action 1 for 201510611073.9 dated Dec. 6, 2016 9 Pages (including translation).

* cited by examiner

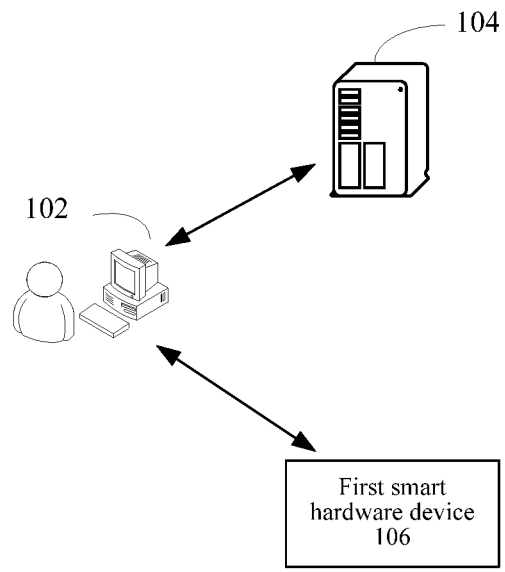

FIG. 1

```
A first client of a game application performs, in the process of running
  the game application in the first client, data exchanging with first
intelligent hardware device that is in wireless communication with the      S202
first client, the game application displaying information about the first
                    intelligent hardware device
```

```
 The first client updates, according to a result of the data exchange, the
information about the first intelligent hardware device that is displayed   S204
                        in the game application
```

FIG. 2

SMART HARDWARE OPERATION METHOD AND APPARATUS

RELATED APPLICATION

This application claims priority to PCT Application No. PCT/CN2016/099089, filed on Sep. 14, 2016, which claims priority of Chinese Patent Application No. 2015106110739, entitled "SMART HARDWARE OPERATION METHOD AND APPARATUS" filed on Sep. 23, 2015. Both applications are incorporated by reference in its entirety.

FIELD OF THE TECHNOLOGY

Embodiments of the present disclosure relate to the field of computers, and specifically, to a smart hardware operation method and apparatus.

BACKGROUND OF THE DISCLOSURE

Today, smart devices have become increasingly popular and attracted attention of a great number of users from smart household to wearable smart device. However, the existing smart devices often perform data exchanges by means of software exchange only and by mainly relying on data recording and storage. Application software and hardware of the smart devices are not well integrated. For example, in a computer game application, a player can only complete the game at the client by using a virtual role but cannot complete the game with another player by integrating data from various smart hardware components. That is, during use of a smart device, smart hardware components of the smart device often can only collect or present data.

SUMMARY

Embodiments of the present disclosure provide a smart hardware operation method and apparatus, to resolve at least the technical problem that smart hardware cannot be integrated with a client application to perform a game operation.

According to one aspect of the embodiments of the present disclosure, a smart hardware operation method is provided. The method includes: running a game application on a first client; exchanging data with a first smart hardware device that is in wireless communication with the first client, the game application displaying information about the first smart hardware device; and displaying updated data about the first smart hardware device in the game application.

According to another aspect of the embodiments of the present disclosure, a smart hardware operation apparatus located in a terminal including a first client of a game application is further provided, including: an exchange unit, configured to perform data exchanging with a first smart hardware device that is in wireless communication with a first client, a game application displaying information about the first smart hardware device on the first client; and an update unit, configured to update, according to a result of the data exchange, the information about the first smart hardware device that is displayed in the game application.

According to another aspect of the embodiments of the present disclosure, a non-transitory computer storage medium, the computer readable storage medium is provided. The computer readable medium is configured to store program code used for performing the following steps: running a game application on a first client; exchanging data with a first smart hardware device that is in wireless communication with the first client, the game application displaying information about the first smart hardware device; and displaying updated data about the first smart hardware device in the game application.

In the embodiments of the present disclosure, in the process of running a game application, a first client of the game application performs data exchanging with first smart hardware device by means of wireless communication, so that the first client and the first smart hardware device are integrated in the game process. Further, the first client updates, according to a result of the data exchange, information about the first smart hardware device that is displayed in the game application. Therefore, the information about the first smart hardware device that is displayed in the first client is updated by means of the real-time exchange with the first smart hardware device, so that the first smart hardware device is integrated into a virtual scenario in the first client. This enables real-time interaction between the smart hardware device and the game application.

BRIEF DESCRIPTION OF THE DRAWINGS

The accompanying drawings described herein are intended to provide further understanding of the present disclosure and constitute a part of this application. Exemplary embodiments of the present disclosure and the description thereof are used for explaining the present disclosure rather than constituting the improper limitation to the present disclosure. In the accompanying drawings:

FIG. 1 is a schematic diagram of an application environment of an optional smart hardware operation method according to an embodiment of the present disclosure;

FIG. 2 is a flowchart of an optional smart hardware operation method according to an embodiment of the present disclosure;

DESCRIPTION OF EMBODIMENTS

Figure 3:
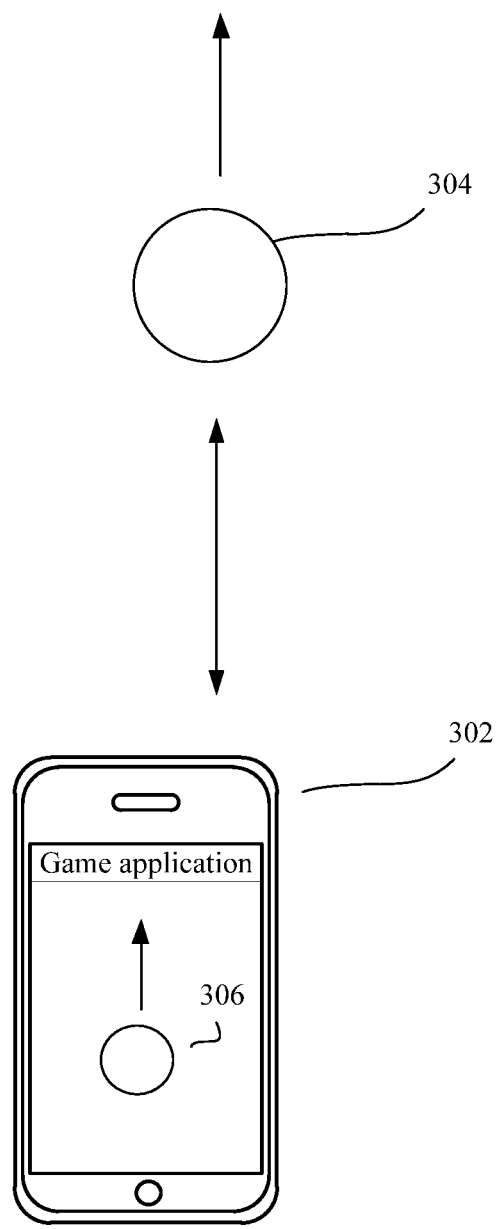
FIG. 3 is a schematic diagram of an optional smart hardware operation method according to an embodiment of the present disclosure.

To make a person skilled in the art better understand the solutions of the present disclosure, the following clearly and completely describes the technical solutions in the embodiments of the present disclosure with reference to the accompanying drawings of the embodiments of the present disclosure. Obviously, the described embodiments are merely a part of the embodiments of the present disclosure rather than all of the embodiments. All other embodiments obtained by a person of ordinary skill in the art based on the embodiments of the present disclosure without creative efforts shall fall within the protection scope of the present disclosure.

It should be noted that in the specification, claims, and accompanying drawings of the present disclosure, the terms "first", "second", and so on are intended to distinguish between similar objects but do not necessarily indicate a specific order or sequence. It should be understood that the numeric termed in such a way are interchangeable in proper circumstances so that the embodiments of the present disclosure described herein can be implemented in orders other than the order illustrated or described herein. Moreover, the terms "include", "contain" and any other variants are used to cover the non-exclusive inclusion. For example, a process, method, system, product, or device that includes a list of steps or units is not necessarily limited to those expressly listed steps and units, but may include other steps or units not expressly listed or inherent to such a process, method, system, product, or device.

According to this embodiment of the present disclosure, an embodiment of a smart hardware operation method is provided. The smart hardware operation method may be, but is not limited to being, applied to an application environment shown in FIG. 1. In the process of logging in, by a terminal 102 installed with a first client of a game application, to the first client to run the game application. The terminal 102 may perform data exchanging with first smart hardware device 106 by means of wireless communication, and updates, according to a result of the exchange, information about the first smart hardware device that is displayed in the game application, so that the first smart hardware device is integrated into a virtual scenario of the game application, to enhance the interaction and authenticity of the game. Optionally, in this embodiment, the terminal may include, but is not limited to, at least one of the following: a mobile phone, a tablet computer, a notebook computer, or a PC computer. The foregoing is merely an example, and embodiments of the present disclosure are not limited by this embodiment.

According to this embodiment of the present disclosure, a smart hardware operation method is provided. As shown in FIG. 2, the method includes the following steps:

S202: A first client of a game application performs, in the process of running the game application in the first client, data exchanging with first smart hardware device that is in wireless communication with the first client, the game application displaying information about the first smart hardware device.

S204: The first client updates, according to a result of the data exchange, the information about the first smart hardware device that is displayed in the game application.

Optionally, in this embodiment, the smart hardware operation method may be, but is not limited to being, applied to a terminal installed with a client of a game application. The game application may include, but is not limited to, an online game or a mobile game. The process of the game application may include, but is not limited to, a round or a time of a game process in the game application. Optionally, in this embodiment, a role in the game application corresponds to the first smart hardware device. That is, the first client may perform, but is not limited to performing, data exchanging with the first smart hardware device, to control the first smart hardware device to complete the game or to control a role that is in the game application and that corresponds to the first smart hardware device to complete the game, so that the first smart hardware device is integrated into a virtual scenario of the game application, to enhance the interaction and authenticity of the game by using the method for virtually enhancing the reality.

Optionally, in this embodiment, in the process of running the game application, the first client of the game application performs the data exchanging with the first smart hardware device by means of wireless communication, so that the first client and the first smart hardware device are integrated in the game process. Further, the first client updates, according to the result of the data exchange, the information about the first smart hardware device that is displayed in the game application. Therefore, the information about the first smart hardware device that is displayed in the first client is updated by means of the real-time exchange with the first smart hardware device, so that the first smart hardware device is integrated into a virtual scenario in the first client, to implement real-time interaction between the smart hardware device and the game application.

Optionally, in this embodiment, the communication connection between the first smart hardware device and the first client is implemented in the wireless communication manner, for example, the manner such as Bluetooth communication or WiFi communication.

Optionally, in this embodiment, the first smart hardware device may be, but is not limited to, a smart apparatus matched with the game application. The client of the game application is logged in at the terminal, so that the matched first smart hardware device is controlled. A conventional device may reconstructed by using smart hardware components and by means of combination between software and hardware, to enable the conventional device to have an intelligent function. After the intelligence is achieved, the hardware has the connection capability to load an Internet service and form a typical architecture of "cloud+end", and therefore has additional values such as big data.

Optionally, in this embodiment, the manner of performing the data exchanging with the first smart hardware device by the first client by means of wireless communication may include, but is not limited to, at least one of the following:

(1) The first client controls, according to an operation result returned by the first smart hardware device, a role that is in the game application and that corresponds to the first smart hardware device to perform a corresponding operation.

(2) The first client controls, by directly controlling a role that is in the game application and that corresponds to the first smart hardware device, the first smart hardware device to perform a corresponding operation.

It should be noted that the foregoing operation may include, but is not limited to, a corresponding action, for example, moving, shaking, crashing, PK (player killing), or role education simulation, in the game application. The foregoing game action is merely an example, and different operations are performed according to different game applications. The various operations are not limited by this embodiment.

Optionally, in this embodiment, information generated by means of the data exchange between the first client and the first smart hardware device may include, but is not limited to, at least one of the following: a game result or a game state.

Optionally, in this embodiment, the information about the first smart hardware device that is displayed in the game application may include, but is not limited to, attribute information of the first smart hardware device. For example, the attribute information of the first smart hardware device may include: the energy value of the first smart hardware device, the trip distance or action that has been completed by the first smart hardware device, or the like.

Optionally, in this embodiment, the first smart hardware device may include, but is not limited to, at least one of the following smart hardware device, for example, a smart ball, a smart band, a smartwatch, or a smart helmet.

Specifically, the description is provided with reference to the following example. As shown in FIG. 3, in the process of running the game application by a first client 302, the first client 302 performs data exchanging with the first smart hardware device (e.g., a smart ball 304 shown in the figure) by means of wireless communication. A role that corresponds to the smart ball 304 and that is in a display interface of the first client 302 is a virtual ball 306. Assuming that the first smart hardware device (the smart ball 304 shown in the figure) is instructed to move forwards, the first client 302 updates, according to the result of the exchange, the information about the first smart hardware device (the smart ball 304 shown in the figure), for example, updating information of the virtual ball 306 that corresponds to the first smart hardware device (the smart ball 304 shown in the figure) and that is displayed in the display interface of the first client 302, that is, the virtual ball 306 also synchronously moves forwards.

By means of this embodiment provided in this application, in the process of running the game application, the first client of the game application performs the data exchanging with the first smart hardware device by means of wireless communication, so that the first client and the first smart hardware device are integrated in the game process. Further, the first client updates, according to the result of the data exchange, the information about the first smart hardware device that is displayed in the game application. Therefore, the information about the first smart hardware device that is displayed in the first client is updated by means of the real-time exchange with the first smart hardware device, so that the first smart hardware device is integrated into a virtual scenario in the first client, to implement real-time interaction between the smart hardware device and the game application.

In one embodiment:

S1: The performing, by a first client of a game application in the process of running the game application in the first client, data exchanging with first smart hardware device that is in wireless communication with the first client includes: receiving, by the first client in the process of running the game application in the first client, an operation result returned by the first smart hardware device.

S2: The updating, by the first client according to a result of the data exchange, the information about the first smart hardware device that is displayed in the game application includes: updating, by the first client according to the operation result, the information about the first smart hardware device that is displayed in the game application.

Optionally, in this embodiment, the first smart hardware device is directly controlled to control a corresponding role in the game application by using the first smart hardware device. For example, in an education simulation game, different operations are performed on the first smart hardware device, to improve the level of a corresponding role in the game application, so as to facilitate the openness of more game functions of the first smart hardware device with the level improvement.

Specifically, the description is provided with reference to the example shown in FIG. 3. Assuming that the first smart hardware device is the smart ball 304, the role that corresponds to the smart ball 304 and that is in the display interface of the first client 302 is the virtual ball 306, and the first client 302 receives an operation result that the smart ball 304 is moved forwards for 3 m, the first client 302 updates, according to the operation result, information about the smart ball 304 that is displayed in the game application, that is, in a display interface of a terminal in which the first client 302 is located, the virtual ball 306 corresponding to the smart ball 304 is moved forwards for 3 m in virtual space.

It should be noted that in this embodiment, the operation on the first smart hardware device may include, but is not limited to, directly performing a corresponding action, for example, moving, crashing, or shaking, on the first smart hardware device according to the setting of the game application. The control operation is performed on the smart hardware device, and the operation result is sent to the first client, so that the role that corresponds to the first smart hardware device and that is in the first client is controlled to perform the same action as the first smart hardware device in virtual space.

By means of this embodiment provided in this application, the operation result returned by the first smart hardware device is received in the process of running the game application in the first client, and the information about the first smart hardware device that is displayed in the game application is updated according to the operation result, so that the information about the first smart hardware device that is displayed in the first client is updated by using the first smart hardware device, to resolve the related problem that smart hardware cannot be integrated with a client to complete a game operation, thereby further implementing the flexible interaction between the first client and the first smart hardware device.

Further, in one embodiment:

S1: Before the receiving, by the first client in the process of running the game application in the first client, an operation result returned by the first smart hardware device, the method further includes the following steps: S12: The first client sends an operation instruction to the first smart hardware device in the process of running the game application in the first client.

S2: The receiving, by the first client in the process of running the game application in the first client, an operation result returned by the first smart hardware device may include the following step: S22: The first client receives, in the process of running the game application in the first client, the operation result that is returned by the first smart hardware device in response to the operation instruction.

Optionally, in this embodiment, a role that is in the game application and that corresponds to the first smart hardware device is directly controlled to control the first smart hardware device. For example, in a racing game, the moving speed or the moving direction of a role is controlled to control the moving speed or the moving direction of the first smart hardware device.

Specifically, the description is provided with reference to the example shown in FIG. 3, assuming that the first smart hardware device is the smart ball 304, the role that corresponds to the smart ball 304 and that is in the display interface of the first client 302 is the virtual ball 306, and the first client 302 sends the operation instruction in the first client 302. For example, the operation instruction instructs the smart ball 304 to move forwards for 3 m, and the smart ball 304 correspondingly moves forwards for 3 m in response to the operation instruction.

It should be noted that in this embodiment, the operation on the first smart hardware device may include, but is not limited to, directly sending the operation instruction to the first smart hardware device according to the setting of the game application, to make the first smart hardware device perform a corresponding action, for example, moving, crashing, or shaking. That is, a corresponding action is performed, in virtual space according to the setting of the game application, on the role corresponding to the smart hardware device, so that the first smart hardware device performs the same action.

By means of this embodiment provided in this application, the first client sends the operation instruction to the first smart hardware device in the process of running the game application in the first client, and the first client receives, in the process of running the game application in the first client, the operation result that is returned by the first smart hardware device in response to the operation instruction, so that the first smart hardware device is controlled by using the first client, to resolve the related problem that smart hardware cannot be integrated with a client to complete a game operation, thereby further implementing the flexible interaction between the first client and the first smart hardware device.

Further, in one embodiment:

S1: The receiving, by the first client in the process of running the game application in the first client, an operation result returned by the first smart hardware device includes the following step: S12: The first client receives movement operation information generated by the first smart hardware device by performing a movement operation.

S2: The updating, by the first client according to the operation result, the information about the first smart hardware device that is displayed in the game application includes the following step: S22: The first client performs, according to the movement operation information, an operation synchronous with the movement operation on a role of the first smart hardware device in the game application.

Optionally, in this embodiment, the first client receives the movement operation information generated by the first smart hardware device by performing the movement operation, and performs, according to the movement operation information, the operation synchronous with the movement operation on the role that is in the game application and that corresponds to the first smart hardware device. The first smart hardware device keeps being controlled, so that the role level of the role that is in the game application and that corresponds to the first smart hardware device is improved. Further, more game functions are opened to a player by means of the improvement of the role level.

Optionally, in this embodiment, the movement operation information of the first smart hardware device may include, but is not limited to, being reported to the first client in real time by using a wireless transmission signal. The wireless transmission signal may include, but is not limited to, Bluetooth, WiFi, or the like. The movement operation performed by the first smart hardware device may include, but is not limited to, moving, shaking, crashing, or the like.

Optionally, in this embodiment, the first client records the movement operation information sent by the first smart hardware device, and synchronously converts the movement operation information into the operation on the role that is in the game application and that corresponds to the first smart hardware device, to drive the role to grow up and to be upgraded.

Figure 4:
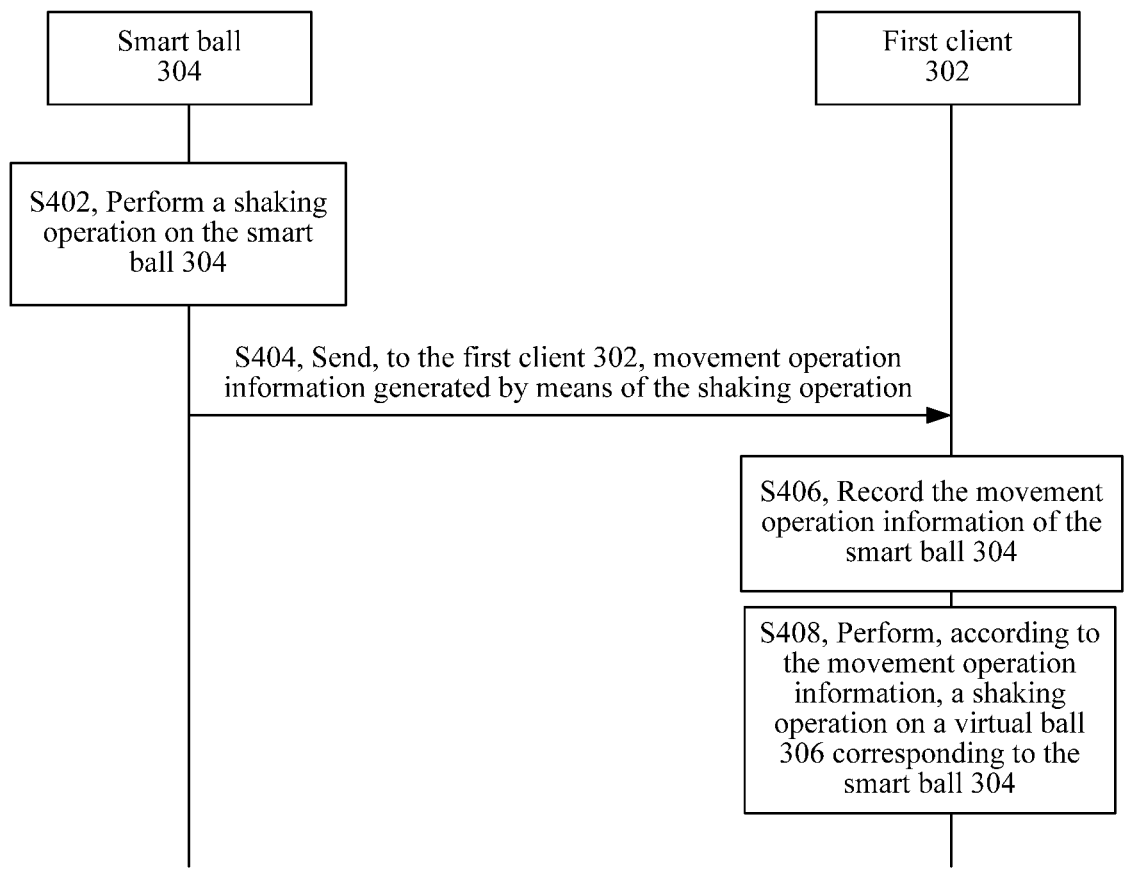
FIG. 4 is a flowchart of another optional smart hardware operation method according to an embodiment of the present disclosure.
Figure 5:
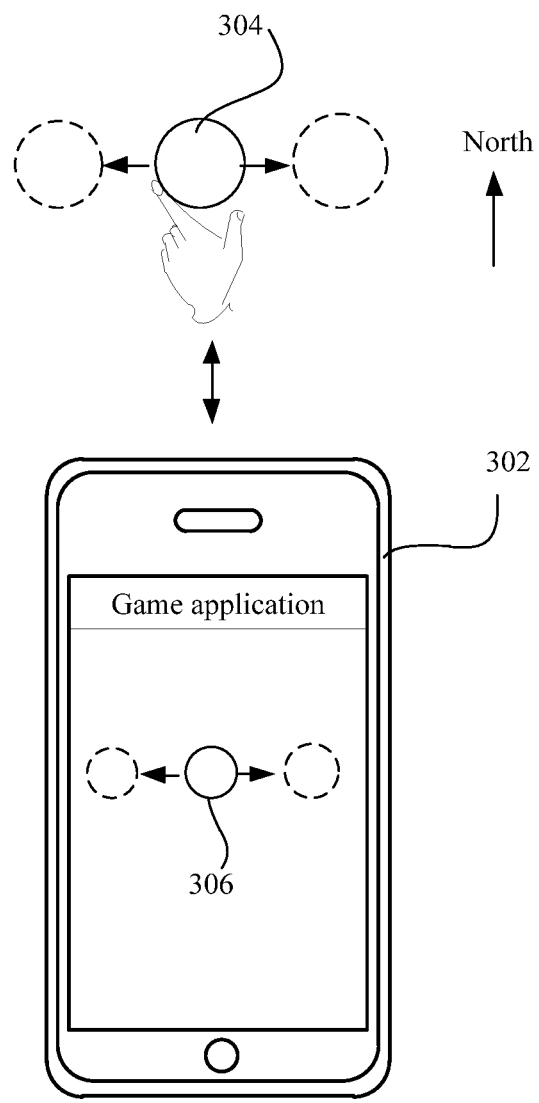
FIG. 5 is a schematic diagram of another optional smart hardware operation method according to an embodiment of the present disclosure.

Specifically, the description is provided with reference to the following example. As shown in FIG. 4, it is assumed that the first smart hardware device is a smart ball 304 performing data exchanging with a first client 302. A role that is in the game application and that corresponds to the smart ball 304 is a virtual ball 306. The specific process includes step S402 to S408 shown in FIG. 4. A shaking operation, for example, shaking left and right for three times, is performed on the smart ball 304. Then, the smart ball 304 sends the generated movement operation information to the first client 302 running the game application, so that the first client 302 records the movement operation information, and performs, on the virtual ball 306 corresponding to the smart ball 304 and according to the movement operation information, a shaking operation synchronous with the operation on the smart ball 304. As shown in FIG. 5, when the smart ball 304 is shaken left and right for three times, the virtual ball 306 in the first client 302 is also displayed being shaken left and right for three times.

It should be noted that the foregoing is merely an example, the first smart hardware device in this embodiment may further be smart hardware of another form, for example, a smart band, a smartwatch, or a smart helmet, and other smart devices.

By means of this embodiment provided in this application, the first client performs, according to the movement operation information generated by the first smart hardware device by performing the movement operation, the operation synchronous with the movement operation of the first smart hardware device on the role of the first smart hardware device in the game application. In this way, the problem in the conventional technology that a game operation in a game application can only be completed at the client software application layer is resolved, so that software and hardware are mutually integrated, a user pays more attention on the practical operation ability, and the direction is turned from virtual space to the reality, thereby implementing the flexible interaction between the software and the hardware in the process of playing the game by the user.

In one embodiment, the updating, by the first client according to the operation result, the information about the first smart hardware device that is displayed in the game application further includes the following step:

S1: The first client updates, according to the movement operation information, attribute data of the role of the first smart hardware device in the game application.

Optionally, in this embodiment, the attribute data of the role may include, but is not limited to, a role level, a role energy value, role equipment, a scenario in which the role is located, or the like. That is, this embodiment may be applied to an education simulation game. The attribute data of the role of the first smart hardware device in the game application is updated in the first client, to create a virtual game scenario, for example, creating a virtual moving track or a virtual environment, for the first smart hardware device in virtual space. In this way, different controls are performed on the first smart hardware device in different scenarios, to drive the role to be upgraded and to grow up in the virtual space. Further, the first smart hardware device is integrated into different scenarios provided by the first client, to implement the synchronous interaction between the first client and the first smart hardware device.

In one embodiment:

S1: Before the sending, by the first client, an operation instruction to the first smart hardware device in the process of running the game application in the first client, the method further includes the following steps: S12: The first client obtains the location of the first smart hardware device. S14: The first client generates a virtual map in the game application in response to the location of the first smart hardware device.

S2: The sending, by the first client, an operation instruction to the first smart hardware device in the process of running the game application in the first client includes the following step: S22: The first client sends a movement operation instruction to the first smart hardware device, the movement operation instruction being used for instructing the first smart hardware device to perform a movement operation.

S3: The receiving, by the first client in the process of running the game application in the first client, an operation result returned by the first smart hardware device includes the following step: S32: The first client receives movement operation information generated by the first smart hardware device by performing the movement operation.

S4: The updating, by the first client according to the operation result, the information about the first smart hardware device that is displayed in the game application includes the following step: S42: The first client performs, in the virtual map according to the movement operation information, an operation synchronous with the movement operation on a role of the first smart hardware device in the game application.

Optionally, in this embodiment, when obtaining relative location information of the first smart hardware device, the first client may synchronously generate the virtual map in the first client. Further, when sending the movement operation instruction to the first smart hardware device to control the first smart hardware device to move, the first client receives, in real time, the movement operation information generated by the first smart hardware device by performing the movement operation instructed by the movement operation instruction, to synchronize the location information of the first smart hardware device to the first client, so as to obtain the location, in the virtual map, of the role that is in the game application and that corresponds to the first smart hardware device. The location of the role is synchronous with the location information of the first smart hardware device.

Optionally, in this embodiment, the virtual map may be, but is not limited to, a section of a virtual track. The virtual track may be a closed track, or may be an open track.

Figure 6:
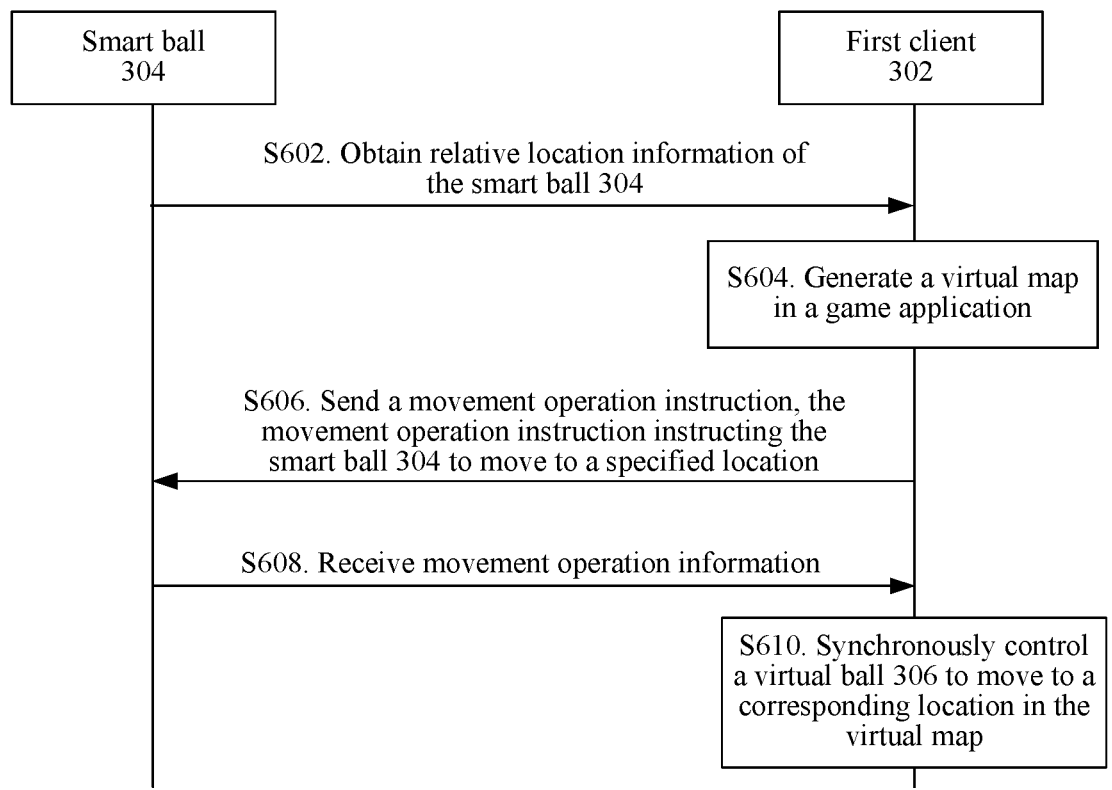
FIG. 6 is a flowchart of still another optional smart hardware operation method according to an embodiment of the present disclosure.
Figure 7:
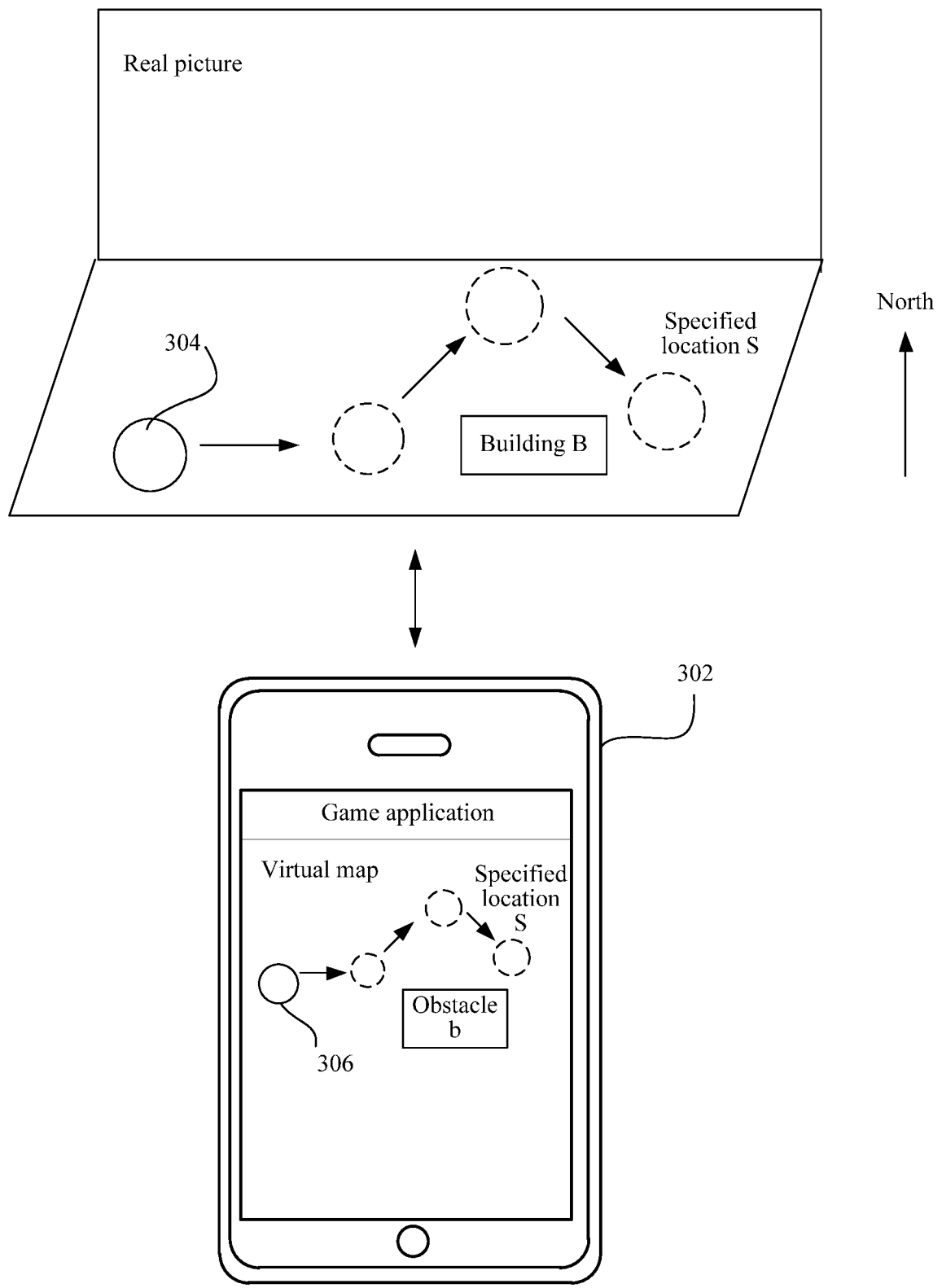
FIG. 7 is a schematic diagram of still another optional smart hardware operation method according to an embodiment of the present disclosure.

Specifically, the description is provided with reference to the following example. As shown in FIG. 6, it is assumed that the first smart hardware device is a smart ball 304 performing data exchanging with a first client 302. A role that is in the game application and that corresponds to the smart ball 304 is a virtual ball 306. The specific process includes S602 to S610 shown in FIG. 6. Related location information of the smart ball 304 is obtained, and the virtual map is generated in the game application. Further, the movement operation instruction is sent to the smart ball 304, to control the smart ball 304 to move to a specified location. In this case, the first client 302 receives the movement operation information generated by the smart ball 304 by performing the movement operation according to the movement operation instruction, and synchronously controls, according to the movement operation information, the virtual ball 306 to move to a corresponding location in the virtual map. As shown in FIG. 7, the relative location information of the smart ball 304 is obtained. For example, in a real image, the smart ball 304 is currently in a relatively spacious square, and there is a building B in the south of the square. Therefore, when the virtual map is generated the game application, an obstacle b is generated in a corresponding location. The movement operation instruction is sent to the smart ball 304, to control the smart ball 304 to bypass the building B to move to a specified location S according to a preset track (shown by the dotted line in the figure). In this case, the first client 302 receives the movement operation information generated by the smart ball 304 by performing the movement operation according to the movement operation instruction, and synchronously controls, according to the movement operation information, the virtual ball 306 to bypass the obstacle b to move to a corresponding location in the virtual map according to a preset track (shown by the dotted line in the figure).

It should be noted that in this embodiment, the time difference from step S606 to step S610 is relatively small and can be ignored. That is, it can be considered that the location information of the smart ball 304 is synchronized to the first client 302 in real time, and the virtual ball 306 is made perform the operation synchronous with the movement operation of the smart ball 304 in the virtual map.

By means of this embodiment provided in this application, the relative location of the first smart hardware device is obtained, so that the virtual map related to the first smart hardware device is generated in the game application. Further, the role that is in the game application and that corresponds to the first smart hardware device is controlled, according to the data exchange between the first smart hardware device and the first client, to perform the operation synchronous with the movement operation of the first smart hardware device in the virtual map, so that the control of the smart hardware device is integrated, to provide a new game interaction manner for a user.

In one embodiment:

S1: Before the sending, by the first client, an operation instruction to the first smart hardware device in the process of running the game application in the first client, the method further includes the following step: S12: The first client obtains a real image shot by a camera in real time, and displays, in the real image, a role of the first smart hardware device in the game application.

S2: The sending, by the first client, an operation instruction to the first smart hardware device in the process of running the game application in the first client includes the following step: S22: The first client sends a movement operation instruction to the first smart hardware device, the movement operation instruction being used for instructing the first smart hardware device to perform a movement operation.

S3: The receiving, by the first client in the process of running the game application in the first client, an operation result returned by the first smart hardware device includes the following step: S32: The first client receives movement operation information generated by the first smart hardware device by performing the movement operation.

S4: The updating, by the first client according to the operation result, the information about the first smart hardware device that is displayed in the game application includes the following step: S42: The first client performs, in the real image according to the movement operation information, an operation synchronous with the movement operation on the role of the first smart hardware device in the game application.

Optionally, in this embodiment, after the first client obtains the shot real image by using the camera in real time, the method may include, but is not limited to: generating, in the real image, a virtual 3D figure corresponding to the game application. The virtual 3D figure may interact, but is not limited to interacting, with the first smart hardware device according to the scenario shot by the camera. That is, the camera is turned on to shoot the first smart hardware device, and a real scenario in which the first smart hardware device is located is used as a game scenario. Further, some virtual 3D figures corresponding to the game application are created. Therefore, a player can control the first smart hardware device to interact with the virtual 3D figures in the real image of the real scenario.

Figure 8:
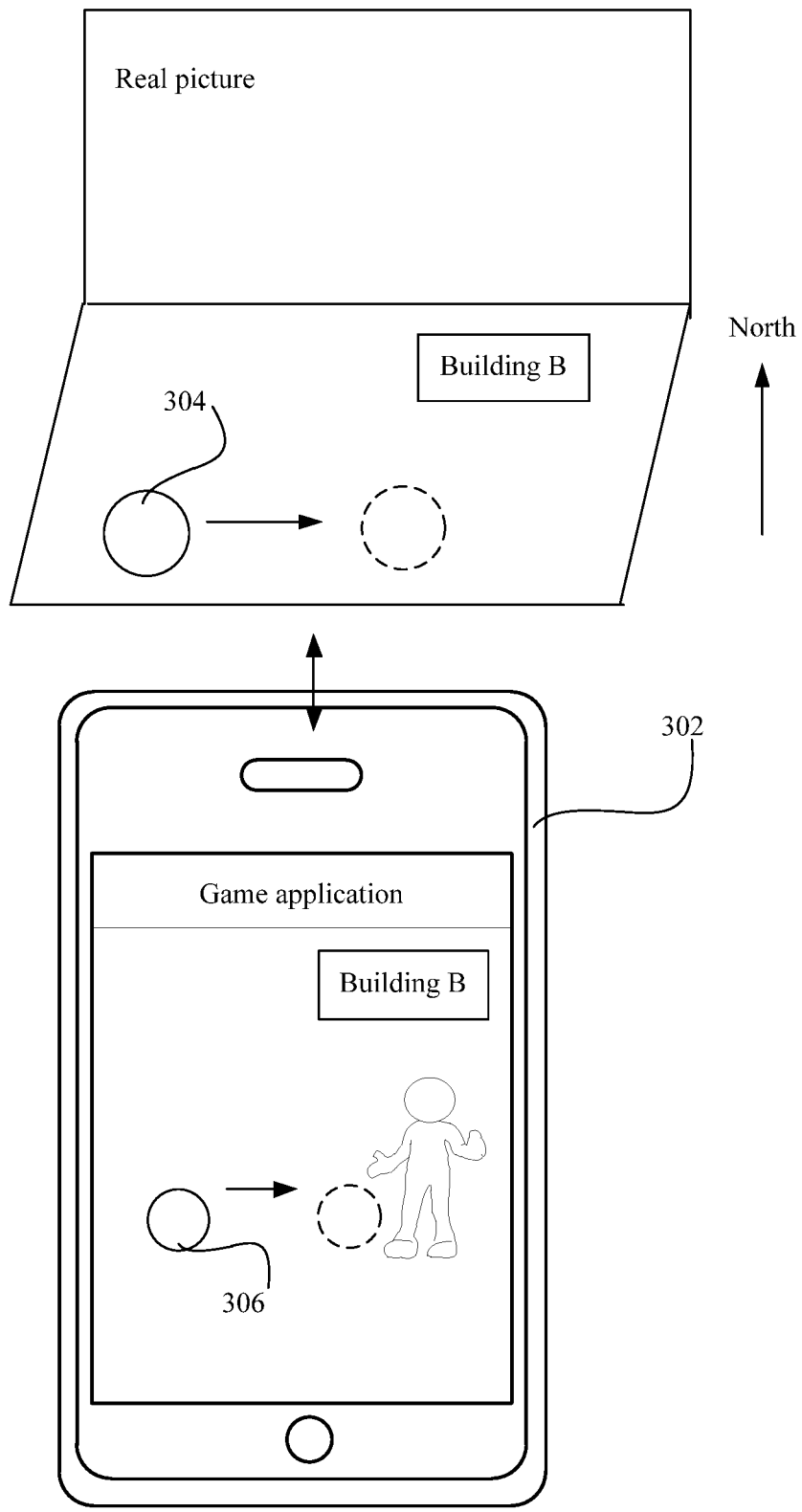
FIG. 8 is a schematic diagram of still another optional smart hardware operation method according to an embodiment of the present disclosure.

Specifically, the description is provided with reference to the following example. As shown in FIG. 8, it is assumed that the first smart hardware device is a smart ball 304 performing data exchanging with a first client 302. A role that is in the game application and that corresponds to the smart ball 304 is a virtual ball 306. The specific process is shown in FIG. 8. The first client 302 obtains the real image shot by the camera in real time. In the real image, the smart ball 304 is currently located in a relatively spacious square, and there is a building B in the north of the square. Both the virtual ball 306 corresponding to the smart ball 304 and another virtual 3D figure are displayed in the real image that is displayed in a display interface of the first client. As shown in FIG. 8, a character role is virtualized. Further, an movement operation instruction of moving to the east to interact with the character role is sent to the smart ball 304. When receiving the movement operation information generated by the smart ball 304 by performing the movement operation, the first client controls the virtual ball 306 displayed in the display interface of the first client 302 to perform a synchronous operation, so that the virtual ball 306 can interact with the virtualized character figure.

By means of this embodiment provided in this application, the first smart hardware device and the virtual figure are brought into the real image, so that the first smart hardware device and the virtual figure interact in the real image, to provide a user with new game experience.

In one embodiment, before the sending, by the first client, an operation instruction to the first smart hardware device in the process of running the game application in the first client, the method further includes the following steps:

S1: The first client receives a setting command.

S2: The first client generates the operation instruction according to the setting command, the operation instruction being used for instructing the first smart hardware device to perform a preset group of movement operations or to move along a preset moving track.

Optionally, in this embodiment, the setting command may include, but is not limited to, at least one of the following: setting of an RGB value, the delay time, the speed, the diversion, or the like.

Optionally, in this embodiment, the first client may directly generate the operation instruction according to the setting command that is already edited, or may generate the operation instruction by obtaining the setting command in real time. The obtaining manner may include downloading. In addition, the obtained setting command needs to be stored. The storing manner may include uploading.

Optionally, in this embodiment, the operation instruction may include, but is not limited to, triggering the first smart hardware device to perform the group of movement operations or to move along the preset moving track. That is, the movement operation that the first smart hardware device needs to perform can be preset, and can be triggered by using the operation instruction. For example, a segment of a moving track from a point A to a point B is preset for the first smart hardware device. The first smart hardware device is triggered by using the operation instruction to move according to the moving track.

Figure 9:
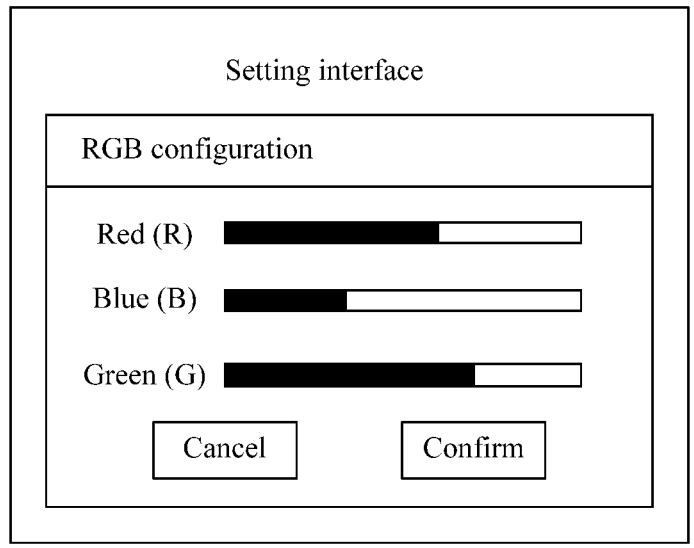
FIG. 9 is a schematic diagram of a setting interface of an optional smart hardware operation method according to an embodiment of the present disclosure.
Figure 10:
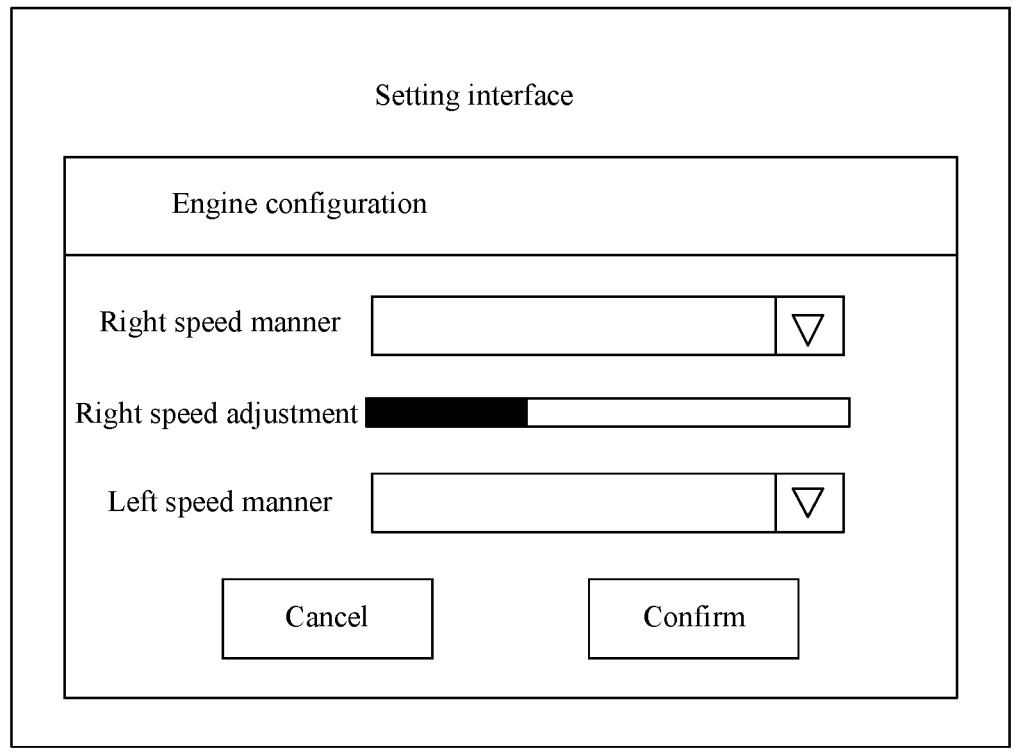
FIG. 10 is a schematic diagram of a setting interface of another optional smart hardware operation method according to an embodiment of the present disclosure.

Specifically, the description is provided with reference to the following example. As shown in FIG. 9 and FIG. 10, the command is set in the visualized manner to generate the corresponding operation instruction. FIG. 9 shows an RGB setting interface. FIG. 10 shows an engine setting interface.

By means of this embodiment provided in this application, an existing visualized instruction is added, deleted, or edited in the first client, so that the behavior and action of the first smart hardware device can be edited and stored, and at last, the operation instruction that can implement one-click control of the first smart hardware device for completing a specified command and action is generated.

In one embodiment:

S1: Before the performing, by a first client of a game application in the process of running the game application in the first client, data exchanging with first smart hardware device that is in wireless communication with the first client, the method further includes the following step: S12: The first client obtains, from a server, a user account having an association relationship with a first user account; and the first client selects a second user account from the user account having the association relationship with the first user account.

S2: After the updating, by the first client according to a result of the data exchange, the information about the first smart hardware device that is displayed in the game application, the method further includes the following step: S22: The first client sends, to a second client of the game application, information generated by means of the data exchange between the first client and the first smart hardware device, the second client performing login with the second user account.

Optionally, in this embodiment, the first client performs login with the first user account; the second client performs the login with the second user account associated with the first user account.

Optionally, in this embodiment, the association relationship between the first user account and the second user account may include, but is not limited to, a preset relationship chain. For example, the second user account is in a friend list of the first user account. Alternatively, the distance between the location of the second client using the second user account and the location of the first client is less than or equal to a preset threshold.

Specifically, the description is provided with reference to the following example. Using an example in which the second user account is in the friend list of the first user account, the first client may obtain, but is not limited to obtaining, from the server of the game application, a user account that is assumed as a user account list (that is, a friend list) and that has an association relationship with the first user account. Therefore, the first client may select the second user account from the user account list, to invite the second user account to start running the game application.

By means of this embodiment provided in this application, the second user account used by the second client and the first user account used by the first client has the association relationship. That is, the first client respectively combine, by using the preset relationship chain, user accounts having the association relationship with corresponding smart hardware device, to run the game application, so as to implement, based on the present relationship chain, the flexible combination with the smart hardware device, to improve the user experience.

It should be noted that for each of the foregoing method embodiments, for ease of description, the method embodiment is described as a series of action combinations, but a person skilled in the art should learn that the present disclosure is not limited to an order of described actions because according to the present disclosure, some steps may use another order or be performed at the same time. Besides, a person skilled in the art should learn that the embodiments described in this specification all belong to preferred embodiments, and related actions and modules may not be necessary for the present disclosure.

By means of the description of the foregoing implementation manners, a person skilled in the art may clearly learn that the method in the foregoing embodiment may be implemented by relying on software and a necessary commodity hardware platform or by using hardware, but the former one may be a preferred implementation manner in many cases. Based on such an understanding, the technical solutions of the present disclosure, or the part contributing to the related technology, may essentially be presented in the form of a software product. The computer software product is stored in a storage medium (for example, a ROM/RAM, a magnetic disk, or an optical disc) including several instructions to enable a terminal device (which may be a cell phone, a computer, a server, a network device, or the like) to perform the methods described in the embodiments.

According to this embodiment of the present disclosure, an embodiment of a smart hardware operation apparatus is provided. An application environment of this application may the same as that described above in relation to FIGS. 1-10, and details are not described in this embodiment again.

Figure 11:
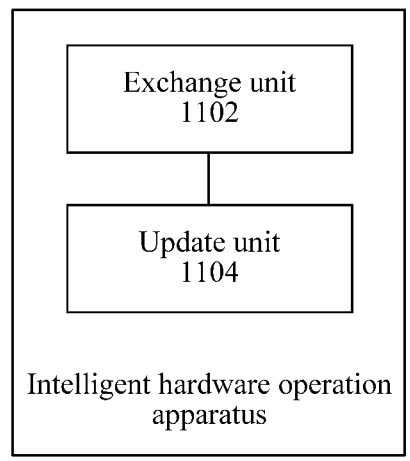
FIG. 11 is a schematic diagram of an optional smart hardware operation apparatus according to an embodiment of the present disclosure.

According to this embodiment of the present disclosure, a smart hardware operation apparatus configured to implement the foregoing smart hardware operation method is further provided. As shown in FIG. 11, the apparatus includes:

(1) an exchange unit 1102, configured to perform, in the process of running a game application in a first client, data exchanging with first smart hardware device that is in wireless communication with the first client, the game application displaying information about the first smart hardware device; and (2) an update unit 1104, configured to update, according to a result of the data exchange, the information about the first smart hardware device that is displayed in the game application.

Optionally, in this embodiment, the smart hardware operation apparatus may be, but is not limited to being, applied to a terminal installed with a client of a game application. The game application may include, but is not limited to, an online game or a mobile game. The process of the game application may include, but is not limited to, a round or a time of a game process in the game application. Optionally, in this embodiment, a role in the game application corresponds to the first smart hardware device. That is, the first client may perform, but is not limited to performing, data exchanging with the first smart hardware device, to control the first smart hardware device to complete the game or to control a role that is in the game application and that corresponds to the first smart hardware device to complete the game, so that the first smart hardware device is integrated into a virtual scenario of the game application, to enhance the interaction and authenticity of the game by using the apparatus for virtually enhancing the reality.

Optionally, in this embodiment, in the process of running the game application, the first client of the game application performs the data exchanging with the first smart hardware device by means of wireless communication, so that the first client and the first smart hardware device are integrated in the game process. Further, the first client updates, according to the result of the data exchange, the information about the first smart hardware device that is displayed in the game application. Therefore, the information about the first smart hardware device that is displayed in the first client is updated by means of the real-time exchange with the first smart hardware device, so that the first smart hardware device is integrated into a virtual scenario in the first client, to implement real-time interaction between the smart hardware device and the game application.

Optionally, in this embodiment, the communication connection between the first smart hardware device and the first client is implemented in the wireless communication manner, for example, the manner such as Bluetooth communication or WiFi communication.

Optionally, in this embodiment, the first smart hardware device may be, but is not limited to, a smart apparatus matched with the game application. The client of the game application is logged in at the terminal, so that the matched first smart hardware device is controlled. A conventional device is reconstructed by using smart hardware device and by means of combination between software and hardware, to enable the conventional device to have an intelligent function. After the intelligence is achieved, the hardware has the connection capability to load an Internet service and form a typical architecture of "cloud+end", and therefore has additional values such as big data.

Optionally, in this embodiment, the manner of performing the data exchanging with the first smart hardware device by the first client by means of wireless communication may include, but is not limited to, at least one of the following:

(1) The first client controls, according to an operation result returned by the first smart hardware device, a role that is in the game application and that corresponds to the first smart hardware device to perform a corresponding operation.

(2) The first client controls, by directly controlling a role that is in the game application and that corresponds to the first smart hardware device, the first smart hardware device to perform a corresponding operation.

It should be noted that the foregoing operation may include, but is not limited to, a corresponding action, for example, moving, shaking, crashing, PK, or role education simulation, in the game application. The foregoing game action is merely an example, and different operations are performed according to different game applications.

Optionally, in this embodiment, information generated by means of the data exchange between the first client and the first smart hardware device may include, but is not limited to, at least one of the following: a game result or a game state.

Optionally, in this embodiment, the information about the first smart hardware device that is displayed in the game application may include, but is not limited to, attribute information of the first smart hardware device. For example, the attribute information of the first smart hardware device may include: the energy value of the first smart hardware device, the trip distance or action that has been completed by the first smart hardware device, or the like.

Optionally, in this embodiment, the first smart hardware device may include, but is not limited to, at least one of the following smart hardware device, for example, a smart ball, a smart band, a smartwatch, or a smart helmet.

Specifically, the description is provided with reference to the following example. As shown in FIG. 3, in the process of running the game application by a first client 302, the first client 302 performs data exchanging with the first smart hardware device (a smart ball 304 shown in the figure) by means of wireless communication. A role that corresponds to the smart ball 304 and that is in a display interface of the first client 302 is a virtual ball 306. Assuming that the first smart hardware device (the smart ball 304 shown in the figure) is instructed to move forwards, the first client 302 updates, according to the result of the exchange, the information about the first smart hardware device (the smart ball 304 shown in the figure), for example, updating information of the virtual ball 306 that corresponds to the first smart hardware device (the smart ball 304 shown in the figure) and that is displayed in the display interface of the first client 302, that is, the virtual ball 306 also synchronously moves forwards.

By means of this embodiment provided in this application, in the process of running the game application, the first client of the game application performs the data exchanging with the first smart hardware device by means of wireless communication, so that the first client and the first smart hardware device are integrated in the game process. Further, the first client updates, according to the result of the data exchange, the information about the first smart hardware device that is displayed in the game application. Therefore, the information about the first smart hardware device that is displayed in the first client is updated by means of the real-time exchange with the first smart hardware device, so that the first smart hardware device is integrated into a virtual scenario in the first client, to implement real-time interaction between the smart hardware device and the game application.

In one embodiment:
(1) The exchange unit includes: (1) a first receiving module, configured to:
  receive, in the process of running the game application in the first client, an operation result returned by the first smart hardware device.
(2) The update unit includes: (2) an update module, configured to update, according to the operation result, the information about the first smart hardware device that is displayed in the game application.

Optionally, in this embodiment, the first smart hardware device is directly controlled to control a corresponding role in the game application by using the first smart hardware device. For example, in an education simulation game, different operations are performed on the first smart hardware device, to improve the level of a corresponding role in the game application, so as to facilitate the openness of more game functions of the first smart hardware device with the level improvement.

Specifically, the description is provided with reference to the example shown in FIG. 3. Assuming that the first smart hardware device is the smart ball 304, the role that corresponds to the smart ball 304 and that is in the display interface of the first client 302 is the virtual ball 306, and the first client 302 receives an operation result that the smart ball 304 is moved forwards for 3 m, the first client 302 updates, according to the operation result, information about the smart ball 304 that is displayed in the game application, that is, in a display interface of a terminal in which the first client 302 is located, the virtual ball 306 corresponding to the smart ball 304 is moved forwards for 3 m in virtual space.

It should be noted that in this embodiment, the operation on the first smart hardware device may include, but is not limited to, directly performing a corresponding action, for example, moving, crashing, or shaking, on the first smart hardware according to the setting of the game application. The control operation is performed on the smart hardware device, and the operation result is sent to the first client, so that the role that corresponds to the first smart hardware device and that is in the first client is controlled to perform the same action as the first smart hardware device in virtual space.

By means of this embodiment provided in this application, the operation result returned by the first smart hardware device is received in the process of running the game application in the first client, and the information about the first smart hardware device that is displayed in the game application is updated according to the operation result, so that the information about the first smart hardware device that is displayed in the first client is updated by using the first smart hardware device, to resolve the related problem that smart hardware cannot be integrated with a client to complete a game operation, thereby further implementing the flexible interaction between the first client and the first smart hardware device.

In one embodiment:
The apparatus further includes: (1) a first sending unit, configured to: before the receiving, in the process of running the game application in the first client, an operation result returned by the first smart hardware device, send an operation instruction to the first smart hardware device in the process of running the game application in the first client.
(2) The first receiving module includes: (1) a first receiving sub-module, configured to receive, in the process of running the game application in the first client, the operation result that is returned by the first smart hardware device in response to the operation instruction.

Optionally, in this embodiment, a role that is in the game application and that corresponds to the first smart hardware device is directly controlled to control the first smart hardware device. For example, in a racing game, the moving speed or the moving direction of a role is controlled to control the moving speed or the moving direction of the first smart hardware device.

Specifically, the description is provided with reference to the example shown in FIG. 3, assuming that the first smart hardware device is the smart ball 304, the role that corresponds to the smart ball 304 and that is in the display interface of the first client 302 is the virtual ball 306, and the first client 302 sends the operation instruction in the first client 302. For example, the operation instruction instructs the smart ball 304 to move forwards for 3 m, and the smart ball 304 correspondingly moves forwards for 3 m in response to the operation instruction.

It should be noted that in this embodiment, the operation on the first smart hardware device may include, but is not limited to, directly sending the operation instruction to the first smart hardware according to the setting of the game application, to make the first smart hardware perform a corresponding action, for example, moving, crashing, or shaking. That is, a corresponding action is performed, in virtual space according to the setting of the game application, on the role corresponding to the smart hardware device, so that the first smart hardware performs the same action.

By means of this embodiment provided in this application, the first client sends the operation instruction to the first smart hardware device in the process of running the game application in the first client, and the first client receives, in the process of running the game application in the first client, the operation result that is returned by the first smart hardware device in response to the operation instruction, so that the first smart hardware device is controlled by using the first client, to resolve the related problem that smart hardware cannot be integrated with a client to complete a game operation, thereby further implementing the flexible interaction between the first client and the first smart hardware device.

In one embodiment:

(1) The first receiving module includes: (1) a second receiving sub-module, configured to receive movement operation information generated by the first smart hardware device by performing a movement operation.

(2) The update module includes: (1) a first processing sub-module, configured to perform, according to the movement operation information, an operation synchronous with the movement operation on a role of the first smart hardware device in the game application.

Optionally, in this embodiment, the first client receives the movement operation information generated by the first smart hardware device by performing the movement operation, and performs, according to the movement operation information, the operation synchronous with the movement operation on the role that is in the game application and that corresponds to the first smart hardware device. The first smart hardware keeps being controlled, so that the role level of the role that is in the game application and that corresponds to the first smart hardware device is improved. Further, more game functions are opened to a player by means of the improvement of the role level.

Optionally, in this embodiment, the movement operation information of the first smart hardware device may include, but is not limited to, being reported to the first client in real time by using a wireless transmission signal. The wireless transmission signal may include, but is not limited to, Bluetooth, WiFi, or the like. The movement operation performed by the first smart hardware device may include, but is not limited to, moving, shaking, crashing, or the like.

Optionally, in this embodiment, the first client records the movement operation information sent by the first smart hardware device, and synchronously converts the movement operation information into the operation on the role that is in the game application and that corresponds to the first smart hardware device, to drive the role to grow up and to be upgraded.

Specifically, the description is provided with reference to the following example. As shown in FIG. 4, it is assumed that the first smart hardware device is a smart ball 304 performing data exchanging with a first client 302. A role that is in the game application and that corresponds to the smart ball 304 is a virtual ball 306. The specific process includes step S402 to S408 shown in FIG. 4. A shaking operation, for example, shaking left and right for three times, is performed on the smart ball 304. Then, the smart ball 304 sends the generated movement operation information to the first client 302 running the game application, so that the first client 302 records the movement operation information, and performs, on the virtual ball 306 corresponding to the smart ball 304 and according to the movement operation information, a shaking operation synchronous with the operation on the smart ball 304. As shown in FIG. 5, when the smart ball 304 is shaken left and right for three times, the virtual ball 306 in the first client 302 is also displayed being shaken left and right for three times.

It should be noted that the foregoing is merely an example, the first smart hardware device in this embodiment may further be smart hardware of another form, for example, a smart band, a smartwatch, or a smart helmet. Embodiments of the present disclosure are not limited by this embodiment.

By means of this embodiment provided in this application, the first client performs, according to the movement operation information generated by the first smart hardware device by performing the movement operation, the operation synchronous with the movement operation of the first smart hardware on the role of the first smart hardware device in the game application. In this way, the problem in the conventional technology that a game operation in a game application can only be completed at the client software application layer is resolved, so that software and hardware are mutually integrated, a user pays more attention on the practical operation ability, and the direction is turned from virtual space to the reality, thereby implementing the flexible interaction between the software and the hardware in the process of playing the game by the user.

In one embodiment, the update module further includes:

(1) an update sub-module, configured to update, according to the movement operation information, attribute data of the role of the first smart hardware device in the game application.

Optionally, in this embodiment, the attribute data of the role may include, but is not limited to, a role level, a role energy value, role equipment, a scenario in which the role is located, or the like. That is, this embodiment may be applied to an education simulation game. The attribute data of the role of the first smart hardware device in the game application is updated in the first client, to create a virtual game scenario, for example, creating a virtual moving track or a virtual environment, for the first smart hardware device in virtual space. In this way, different controls are performed on the first smart hardware device in different scenarios, to drive the role to be upgraded and to grow up in the virtual space. Further, the first smart hardware device is integrated into different scenarios provided by the first client, to implement the synchronous interaction between the first client and the first smart hardware device.

In one embodiment:

The apparatus further includes: (1) a second obtaining unit, configured to: before the sending an operation instruction to the first smart hardware device in the process of running the game application in the first client, obtain the location of the first smart hardware; and (2) a first generation unit, configured to generate a virtual map in the game application in response to the location of the first smart hardware device.

(2) The first sending unit includes: (1) a first sending module, configured to send a movement operation instruction to the first smart hardware device, the movement operation instruction being used for instructing the first smart hardware device to perform a movement operation.

(3) The first receiving module includes: (1) a third receiving sub-module, configured to receive movement operation information generated by the first smart hardware device by performing the movement operation.

(4) The update module includes: (1) a second processing sub-module, configured to perform, in the virtual map according to the movement operation information, an operation synchronous with the movement operation on a role of the first smart hardware device in the game application.

Optionally, in this embodiment, when obtaining relative location information of the first smart hardware device, the first client may synchronously generate the virtual map in the first client. Further, when sending the movement operation instruction to the first smart hardware device to control the first smart hardware device to move, the first client receives, in real time, the movement operation information generated by the first smart hardware device by performing the movement operation instructed by the movement operation instruction, to synchronize the location information of the first smart hardware device to the first client, so as to obtain the location, in the virtual map, of the role that is in the game application and that corresponds to the first smart hardware device. The location of the role is synchronous with the location information of the first smart hardware device.

Optionally, in this embodiment, the virtual map may be, but is not limited to, a section of a virtual track. The virtual track may be a closed track, or may be an open track.

Specifically, the description is provided with reference to the following example. As shown in FIG. 6, it is assumed that the first smart hardware device is a smart ball 304 performing data exchanging with a first client 302. A role that is in the game application and that corresponds to the smart ball 304 is a virtual ball 306. The specific process includes S602 to S610 shown in FIG. 6. Related location information of the smart ball 304 is obtained, and the virtual map is generated in the game application. Further, the movement operation instruction is sent to the smart ball 304, to control the smart ball 304 to move to a specified location. In this case, the first client 302 receives the movement operation information generated by the smart ball 304 by performing the movement operation according to the movement operation instruction, and synchronously controls, according to the movement operation information, the virtual ball 306 to move to a corresponding location in the virtual map. As shown in FIG. 7, the relative location information of the smart ball 304 is obtained. For example, in a real image, the smart ball 304 is currently in a relatively spacious square, and there is a building B in the south of the square. Therefore, when the virtual map is generated the game application, an obstacle b is generated in a corresponding location. The movement operation instruction is sent to the smart ball 304, to control the smart ball 304 to bypass the building B to move to a specified location S according to a preset track (shown by the dotted line in the figure). In this case, the first client 302 receives the movement operation information generated by the smart ball 304 by performing the movement operation according to the movement operation instruction, and synchronously controls, according to the movement operation information, the virtual ball 306 to bypass the obstacle b to move to a corresponding location in the virtual map according to a preset track (shown by the dotted line in the figure).

It should be noted that in this embodiment, the time difference from step S606 to step S610 is relatively small and can be ignored. That is, it can be considered that the location information of the smart ball 304 is synchronized to the first client 302 in real time, and the virtual ball 306 is made perform the operation synchronous with the movement operation of the smart ball 304 in the virtual map.

By means of this embodiment provided in this application, the relative location of the first smart hardware device is obtained, so that the virtual map related to the first smart hardware device is generated in the game application. Further, the role that is in the game application and that corresponds to the first smart hardware device is controlled, according to the data exchange between the first smart hardware device and the first client, to perform the operation synchronous with the movement operation of the first smart hardware device in the virtual map, so that the control of the smart hardware device is integrated, to provide a new game interaction manner for a user.

In one embodiment:

The apparatus further includes: (1) a third obtaining unit, configured to: before the sending an operation instruction to the first smart hardware device in the process of running the game application in the first client, obtain a real image shot by a camera in real time, and display, in the real image, a role of the first smart hardware device in the game application.

(2) The first sending unit includes: (1) a second sending module, configured to send a movement operation instruction to the first smart hardware device, the movement operation instruction being used for instructing the first smart hardware device to perform a movement operation.

(3) The first sending unit includes: (1) a second receiving module, configured to receive movement operation information generated by the first smart hardware device by performing the movement operation.

(4) The update module includes: (1) a third processing sub-module, configured to perform, in the real image according to the movement operation information, an operation synchronous with the movement operation on the role of the first smart hardware device in the game application.

Optionally, in this embodiment, after the first client obtains the shot real image by using the camera in real time, the method may include, but is not limited to: generating, in the real image, a virtual 3D figure corresponding to the game application. The virtual 3D figure may interact, but is not limited to interacting, with the first smart hardware according to the scenario shot by the camera. That is, the camera is turned on to shoot the first smart hardware device, and a real scenario in which the first smart hardware device is located is used as a game scenario. Further, some virtual 3D figures corresponding to the game application are created. Therefore, a player can control the first smart hardware device to interact with the virtual 3D figures in the real image of the real scenario.

Specifically, the description is provided with reference to the following example. As shown in FIG. 8, it is assumed that the first smart hardware device is a smart ball 304 performing data exchanging with a first client 302. A role that is in the game application and that corresponds to the smart ball 304 is a virtual ball 306. The specific process is shown in FIG. 8. The first client 302 obtains the real image shot by the camera in real time. In the real image, the smart ball 304 is currently located in a relatively spacious square, and there is a building B in the north of the square. Both the virtual ball 306 corresponding to the smart ball 304 and another virtual 3D figure are displayed in the real image that is displayed in a display interface of the first client. As shown in FIG. 8, a character role is virtualized. Further, an movement operation instruction of moving to the east to interact with the character role is sent to the smart ball 304. When receiving the movement operation information generated by the smart ball 304 by performing the movement operation, the first client controls the virtual ball 306 displayed in the display interface of the first client 302 to perform a synchronous operation, so that the virtual ball 306 can interact with the virtualized character figure.

By means of this embodiment provided in this application, the first smart hardware device and the virtual figure are brought into the real image, so that the first smart hardware device and the virtual figure interact in the real image, to provide a user with new game experience.

In one embodiment:

The apparatus further includes: (1) a receiving unit, configured to: before the sending an operation instruction to the first smart hardware device in the process of running the game application in the first client, receive a setting command; and (2) a second generation unit, configured to generate the operation instruction according to the setting command, the operation instruction being used for instructing the first smart hardware device to perform a preset group of movement operations or to move along a preset moving track.

Optionally, in this embodiment, the setting command may include, but is not limited to, at least one of the following: setting of an RGB value, the delay time, the speed, the diversion, or the like.

Optionally, in this embodiment, the first client may directly generate the operation instruction according to the setting command that is already edited, or may generate the operation instruction by obtaining the setting command in real time. The obtaining manner may include downloading. In addition, the obtained setting command needs to be stored. The storing manner may include uploading.

Optionally, in this embodiment, the operation instruction may include, but is not limited to, triggering the first smart hardware device to perform the group of movement operations or to move along the preset moving track. That is, the movement operation that the first smart hardware needs to perform can be preset, and can be triggered by using the operation instruction. For example, a segment of a moving track from a point A to a point B is preset for the first smart hardware device. The first smart hardware device is triggered by using the operation instruction to move according to the moving track.

Specifically, the description is provided with reference to the following example. As shown in FIG. 9 and FIG. 10, the command is set in the visualized manner to generate the corresponding operation instruction. FIG. 9 shows an RGB setting interface. FIG. 10 shows an engine setting interface.

By means of this embodiment provided in this application, an existing visualized instruction is added, deleted, or edited in the first client, so that the behavior and action of the first smart hardware can be edited and stored, and at last, the operation instruction that can implement one-click control of the first smart hardware for completing a specified command and action is generated.

In one embodiment:

The apparatus further includes: (1) a third obtaining unit, configured to: before the performing, in the process of running a game application in a first client, data exchanging with first smart hardware device that is in wireless communication with the first client, obtain, from a server, a user account having an association relationship with a first user account, where the first client selects a second user account from the user account having the association relationship with the first user account.

The apparatus further includes: (1) a fourth sending unit, configured to: after the updating, according to a result of the data exchange, the information about the first smart hardware device that is displayed in the game application, send, to a second client of the game application, information generated by means of the data exchange between the first client and the first smart hardware device, the second client performing login with the second user account.

Optionally, in this embodiment, the first client performs login with the first user account; the second client performs the login with the second user account associated with the first user account.

Optionally, in this embodiment, the association relationship between the first user account and the second user account may include, but is not limited to, a preset relationship chain. For example, the second user account is in a friend list of the first user account. Alternatively, the distance between the location of the second client using the second user account and the location of the first client is less than or equal to a preset threshold.

Specifically, the description is provided with reference to the following example. Using an example in which the second user account is in the friend list of the first user account, the first client may obtain, but is not limited to obtaining, from the server of the game application, a user account that is assumed as a user account list (that is, a friend list) and that has an association relationship with the first user account. Therefore, the first client may select the second user account from the user account list, to invite the second user account to start running the game application.

By means of this embodiment provided in this application, the second user account used by the second client and the first user account used by the first client has the association relationship. That is, the first client respectively combine, by using the preset relationship chain, user accounts having the association relationship with corresponding smart hardware device, to run the game application, so as to implement, based on the present relationship chain, the flexible combination with the smart hardware device, to improve the user experience.

Figure 12:
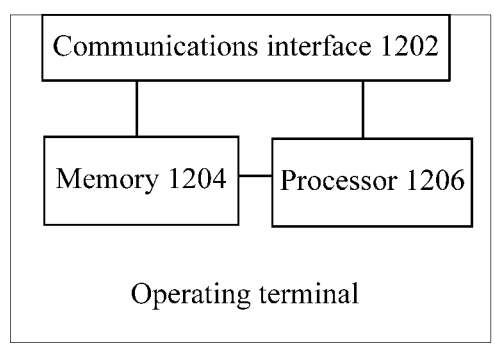
FIG. 12 is a schematic diagram of an optional operating terminal according to an embodiment of the present disclosure.

According to this embodiment of the present disclosure, an operating terminal configured to implement the foregoing smart hardware operation method is further provided. As shown in FIG. 12, the terminal includes:

(1) a communications interface 1202, configured to perform, in the process of running a game application in a first client, data exchanging with first smart hardware device that is in wireless communication with the first client, the game application displaying information about the first smart hardware;

(2) a memory 1204, connected to the communications interface 1202 and configured to store the information about the first smart hardware; and (3) a processor 1206, connected to the communications interface 1202 and the memory 1204 and configured to update, according to a result of the data exchange, the information about the first smart hardware device that is displayed in the game application.

Optionally, for specific examples in this embodiment, refer to the examples described above, and details are not described in this embodiment again.

This embodiment of the present disclosure further provides a storage medium. Optionally, in this embodiment, the storage medium may be located in at least one of multiple network devices in a network such as a mobile communications network, a wide area network, a metropolitan area network, or a local area network.

Optionally, in this embodiment, the storage medium is configured to store program code used for performing the following steps: S1: performing, by a first client of a game application in the process of running the game application in the first client, data exchanging with first smart hardware device that is in wireless communication with the first client, the game application displaying information about the first smart hardware; and S2: updating, by the first client according to a result of the data exchange, the information about the first smart hardware device that is displayed in the game application.

Optionally, in this embodiment, the storage medium is further configured to store program code used for performing the following steps: receiving, in the process of running the game application in the first client, an operation result returned by the first smart hardware; and updating, according to the operation result, the information about the first smart hardware device that is displayed in the game application.

Optionally, in this embodiment, the storage medium is further configured to store program code used for performing the following steps: before the receiving, in the process of running the game application in the first client, an operation result returned by the first smart hardware device, sending an operation instruction to the first smart hardware device in the process of running the game application in the first client; and receiving, in the process of running the game application in the first client, the operation result that is returned by the first smart hardware device in response to the operation instruction.

Optionally, in this embodiment, the storage medium is further configured to store program code used for performing the following steps: receiving movement operation information generated by the first smart hardware device by performing a movement operation; and performing, according to the movement operation information, an operation synchronous with the movement operation on a role of the first smart hardware device in the game application.

Optionally, in this embodiment, the storage medium is further configured to store program code used for performing the following step: updating, according to the movement operation information, attribute data of the role of the first smart hardware device in the game application.

Optionally, in this embodiment, the storage medium is further configured to store program code used for performing the following steps: before the sending an operation instruction to the first smart hardware device in the process of running the game application in the first client, obtaining the location of the first smart hardware; and generating a virtual map in the game application in response to the location of the first smart hardware; and sending a movement operation instruction to the first smart hardware device, the movement operation instruction being used for instructing the first smart hardware device to perform a movement operation; receiving movement operation information generated by the first smart hardware device by performing the movement operation; and performing, in the virtual map according to the movement operation information, an operation synchronous with the movement operation on a role of the first smart hardware device in the game application.

Optionally, in this embodiment, the storage medium is further configured to store program code used for performing the following steps: before the sending an operation instruction to the first smart hardware device in the process of running the game application in the first client, obtaining a real image shot by a camera in real time, and displaying, in the real image, a role of the first smart hardware device in the game application; sending a movement operation instruction to the first smart hardware device, the movement operation instruction being used for instructing the first smart hardware device to perform a movement operation; receiving movement operation information generated by the first smart hardware device by performing the movement operation; and performing, in the real image according to the movement operation information, an operation synchronous with the movement operation on the role of the first smart hardware device in the game application.

Optionally, in this embodiment, the storage medium is further configured to store program code used for performing the following steps: before the sending an operation instruction to the first smart hardware device in the process of running the game application in the first client, receiving a setting command; and generating the operation instruction according to the setting command, the operation instruction being used for instructing the first smart hardware device to perform a preset group of movement operations or to move along a preset moving track.

Optionally, in this embodiment, the storage medium is further configured to store program code used for performing the following steps: before the performing, in the process of running the game application in the first client, data exchanging with first smart hardware device that is in wireless communication with the first client, obtaining, from a server, a user account having an association relationship with a first user account; and selecting a second user account from the user account having the association relationship with the first user account; and after the updating, according to a result of the data exchange, the information about the first smart hardware device that is displayed in the game application, sending, to a second client of the game application, information generated by means of the data exchange between the first client and the first smart hardware device, the second client performing login with the second user account.

Optionally, in this embodiment, the storage medium may include, but is not limited to, a medium such as a USB flash drive, a read-only memory (ROM), a random access memory (RAM), a removable hard disk, a magnetic disk, or an optical disc that can store program code.

Optionally, for specific examples in this embodiment, refer to the examples described in FIG. 1-10, and details are not described in this embodiment again.

The sequence numbers of the foregoing embodiments of the present disclosure are merely for the convenience of description, and do not imply the preference among the embodiments.

When the integrated unit in the foregoing embodiment is implemented in the form of a software function unit and sold or used as an independent product, the integrated unit may be stored in the foregoing computer readable storage medium. Based on such an understanding, the technical solutions of the present disclosure, or the part contributing to the related technology, or all or some of the technical solutions may essentially be presented in the form of a software product. The computer software product is stored in a storage medium, and includes several instructions for instructing one or more computer devices (which may be a personal computer, a server, a network device, or the like) to perform all or some of the steps of the methods described in the embodiments of the present disclosure.

In the foregoing embodiments of the present disclosure, the descriptions of the embodiments have their respective focuses. For a part that is not described in detail in an embodiment, refer to related descriptions in other embodiments.

In the several embodiments provided in this application, it should be understood that the provided client may be implemented in another manner. The apparatus embodiments described above are merely exemplary. For example, the division of the units is merely the division of logic functions, and may use other division manners during actual implementation. For example, multiple units or components may be integrated, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical, mechanical, or of other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments. The functional units in the present disclosure each refers to one or more computer programs stored in a computer readable medium. When executed by one or more processors, the computer programs may implement the functions described in relation to the corresponding functional unit, as described in relation to FIGS. 11 and 12.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software functional unit.

The foregoing descriptions are exemplary implementation manners of the present disclosure. It should be noted that a person of ordinary skill in the art may make certain improvements and polishing without departing from the principle of the present disclosure and the improvements and polishing shall fall within the protection scope of the present disclosure.

INDUSTRIAL APPLICABILITY

By means of the embodiments of the present disclosure, in the process of running a game application, a first client of the game application performs data exchanging with first smart hardware device by means of wireless communication, so that the first client and the first smart hardware device are integrated in the game process. Further, the first client updates, according to a result of the data exchange, information about the first smart hardware device that is displayed in the game application. Therefore, the information about the first smart hardware device that is displayed in the first client is updated by means of the real-time exchange with the first smart hardware device, so that the first smart hardware device is integrated into a virtual scenario in the first client. This enables real-time interaction between the smart hardware device and the game application.

What is claimed is:

1. A smart hardware operation method, comprising:
running a game application on a first client;
exchanging data with a first smart hardware device that is in wireless communication with the first client, the game application displaying information about the first smart hardware device;
obtaining a real image shot by a camera of the first client in real time, the real image including the first smart hardware device;
displaying in the real image a role of the first smart hardware device in the game application;
sending, an operation instruction to the first smart hardware device in a process of running the game application in the first client; and
displaying updated data about the first smart hardware device in the game application comprising:
receiving an operation result generated by the first smart hardware device in response to the operation instruction; and
performing, in the real image according to the operation information, an operation synchronous with the operation result on the role of the first smart hardware device in the game application.

2. The method according to claim 1, further comprising:
receiving movement operation information generated by the first smart hardware device by performing a movement operation; and
performing, according to the movement operation information, the operation synchronous with the movement operation on the role of the first smart hardware device in the game application.

3. The method according to claim 2, further comprising:
updating, according to the movement operation information, attribute data of the role of the first smart hardware device in the game application.

4. The method according to claim 1, further comprising:
obtaining the location of the first smart hardware device; and generating, a virtual map in the game application in response to the location of the first smart hardware device;
sending a movement operation instruction to the first smart hardware device, the movement operation instruction being used for instructing the first smart hardware device to perform a movement operation;
receiving movement operation information generated by the first smart hardware device by performing the movement operation; and
performing, in the virtual map according to the movement operation information, the operation synchronous with the movement operation on the role of the first smart hardware device in the game application.

5. The method according to claim 1, wherein
the operation instruction is a movement operation instruction for instructing the first smart hardware device to perform a movement operation; and
the operation result includes movement operation information generated by the first smart hardware device by performing the movement operation.

6. The method according to claim 1, further comprising:
receiving a setting command; and
generating the operation instruction according to the setting command, the operation instruction being used for instructing the first smart hardware device to perform a group of movement operations or to move along a moving track.

7. The method according to claim 1, further comprising:
obtaining a user account having an association relationship with a first user account; and selecting a second user account from the user account having the association relationship with the first user account; and
sending, to a second client of the game application, information generated by means of the data exchange between the first client and the first smart hardware device, the second client performing login with the second user account.

8. A smart hardware operation apparatus, located in a terminal comprising a first client of a game application, the apparatus comprising: a memory and a processor coupled to the memory, the processor being configured to:
perform data exchanging with a first smart hardware device that is in wireless communication with a first client, a game application displaying information about the first smart hardware device on the first client;
obtain a real image shot by a camera of the first client in real time, the real image including the first smart hardware device;

display in the real image a role of the first smart hardware device in the game application;
send an operation instruction to the first smart hardware device in a process of running the game application in the first client; and
update, according to a result of the data exchange, the information about the first smart hardware device displayed in the game application, comprising:
receiving an operation result generated by the first smart hardware device in response to the operation instruction; and
performing, in the real image according to the operation information, an operation synchronous with the operation result on the role of the first smart hardware device in the game application.

9. The apparatus according to claim 8, wherein the processor is further configured to:
receive movement operation information generated by the first smart hardware device by performing a movement operation; and
perform, according to the movement operation information, the operation reflecting the movement operation on the role of the first smart hardware device in the game application.

10. The apparatus according to claim 9, wherein the processor is further configured to:
update, according to the movement operation information, attribute data of the role of the first smart hardware device in the game application.

11. The apparatus according to claim 8, wherein the processor is further configured to:
obtain the location of the first smart hardware device; and
a first generation unit, configured to generate a virtual map in the game application in response to the location of the first smart hardware device;
send a movement operation instruction to the first smart hardware device, the movement operation instruction being used for instructing the first smart hardware device to perform a movement operation;
receive movement operation information generated by the first smart hardware device by performing the movement operation; and
perform, in the virtual map according to the movement operation information, the operation reflecting the movement operation on the role of the first smart hardware device in the game application.

12. The apparatus according to claim 8, wherein
the operation instruction is a movement operation instruction for instructing the first smart hardware device to perform a movement operation; and
the operation result includes movement operation information generated by the first smart hardware device by performing the movement operation.

13. The apparatus according to claim 8, wherein the processor is further configured to:
receive a setting command; and
generate the operation instruction according to the setting command, the operation instruction being used for instructing the first smart hardware device to perform a group of movement operations or to move along a moving track.

14. The apparatus according to claim 8, wherein the processor is further configured:
obtain a user account having an association relationship with a first user account, wherein the first client selects a second user account from the user account having the association relationship with the first user account; and
send, to a second client of the game application, information generated by means of the data exchange between the first client and the first smart hardware device, the second client performing login with the second user account.

15. A non-transitory computer readable storage medium, the computer readable storage medium being configured to store program code used for performing the following steps:
running a game application on a first client;
exchanging data with a first smart hardware device that is in wireless communication with the first client, the game application displaying information about the first smart hardware device;
obtaining a real image shot by a camera of the first client in real time, the real image including the first smart hardware device;
displaying in the real image a role of the first smart hardware device in the game application;
sending, an operation instruction to the first smart hardware device in a process of running the game application in the first client; and
displaying updated data about the first smart hardware device in the game application, comprising:
receiving an operation result generated by the first smart hardware device in response to the operation instruction; and
performing, in the real image according to the operation information, an operation synchronous with the operation result on the role of the first smart hardware device in the game application.

16. The method according to claim 1, further comprising:
generating and placing a virtual figure in the real image shown in the game application; and
controlling the virtual figure to interact with the role of the first smart hardware device in the game application according to the real image shot by the camera and the operation information.

17. The method according to claim 3, wherein:
the attribute data of the role of the first smart hardware device includes at least one of: a role level, a role energy value, role equipment, or location scenario.

* * * * *